C. G. A. BACKDAHL.
EXPANSIBLE CORE FOR INDIA RUBBER ARTICLES.
APPLICATION FILED DEC. 14, 1915.

1,354,459.

Patented Sept. 28, 1920.

Inventor
Carl Gustaf Alfred Bäckdahl

Attorney.

UNITED STATES PATENT OFFICE.

CARL GUSTAF ALFRED BÄCKDAHL, OF STOCKHOLM, SWEDEN, ASSIGNOR TO UNITED STATES TIRE COMPANY, A CORPORATION OF NEW YORK.

EXPANSIBLE CORE FOR INDIA-RUBBER ARTICLES.

1,354,459.  Specification of Letters Patent.  Patented Sept. 28, 1920.

Application filed December 14, 1915. Serial No. 66,693.

*To all whom it may concern:*

Be it known that I, CARL GUSTAF ALFRED BÄCKDAHL, engineer, subject of the King of Sweden, residing at Birger Jarlsgatan 32, Stockholm, Sweden, have invented new and useful Improvements in Expansible Cores for India-Rubber Articles, of which the following is a specification.

The present invention has for object an expansible core or mandrel for making articles of india rubber with or without inlays of canvas, whereby the article built up on the core can be vulcanized in one continuous process and the india rubber material be caused to fill up the mold exactly to form tread ribs or other projections on the surface of the article in question.

Although the invention is adapted to be employed in the manufacture of india rubber articles of different nature, it will be described below as applied to cores for pneumatic tires.

Figure 1:
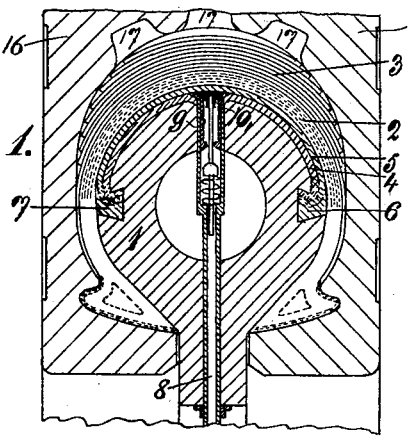
Figure 2:
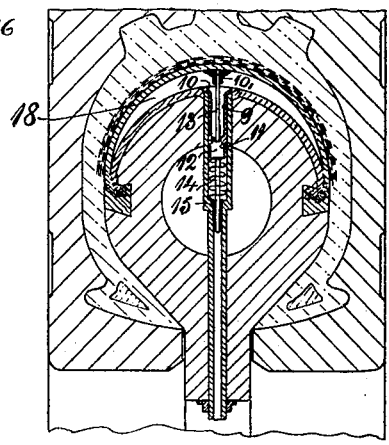
Figure 3:
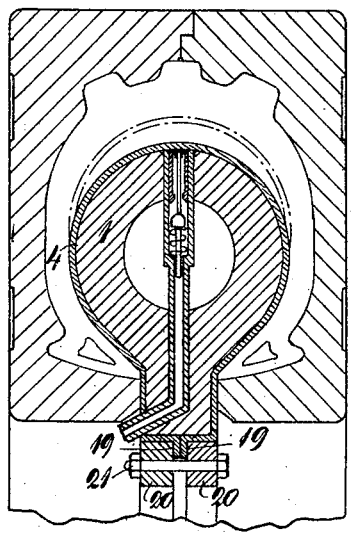
Figure 4:
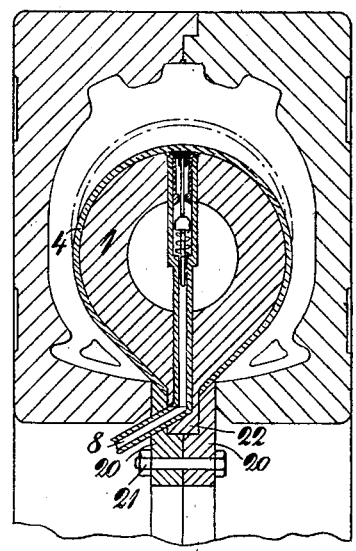
Figure 5:
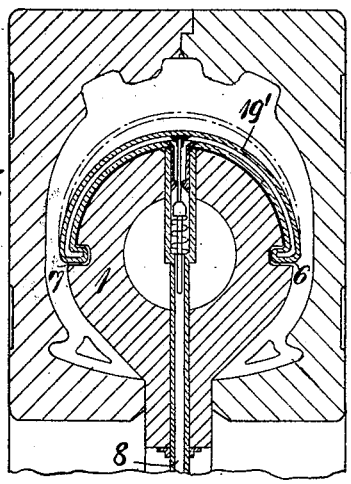

On the drawing Figure 1 is a cross section through an annular core or mandrel with india rubber and canvas material built upon said core, being inclosed in a mold made in two parts, said india rubber and canvas materials being shown in position before the vulcanization is performed. Fig. 2 is a similar cross section showing the parts in position after the vulcanization is performed. Figs. 3, 4 and 5 show cross sections of a core, in connection with modified devices of the invention.

With reference to Figs. 1 and 2, 1 indicates an annular core or mandrel of cast iron, which may be made in one single piece or in several pieces according to the circumstances, upon which the canvas material 2 and the india rubber material 3 are built up in the usual manner. 4 and 5 indicate mantles, made of any suitable tensible and gas or liquid proof material, which is resistible to the heat, necessary for performing the vulcanization. As a suitable material for said purpose lead may be mentioned. The mantles extend down a suitable distance along the sides of the core 1, and their ends are fixed to said sides in any suitable manner, as in grooves 6, 7, which after the insertion of said ends of the mantles may be filled with lead. The inner mantle 4 is placed tightly upon the surface of the core 1, mainly on that part of the same, facing the tread surface of the tire. The outer mantle 5 is placed upon said inner mantle 4 as shown.

The core 1 is provided with a bore receiving a supply pipe 8 for liquid or gas under pressure. At the inner end of said pipe 8 is inserted a hollow piece 9, penetrating the mantle 4 and formed at its inner end as a seat 10 for a valve 10', the surface of which is curved corresponding to the curvature of the mantle 4 as shown. The opposite end of said piece 9 is formed as a seat 11 for a second valve 12, fixed on the same spindle 13 as the said valve 10'. A spring 14, inserted between the valve 12 and a shoulder 15 of the pipe 8, tends to close the valve 10', in which position the valve 12 is open.

16 indicates the mold, made in two pieces and provided with grooves 17, corresponding to the tread ribs or other projections to be formed on the outer surface of the tire.

The supply pipe 8 is connected with any suitable source of liquid or gas under pressure, which is admitted through said pipe to the space between the mantles 4 and 5, opening the valve 10' against the action of the spring 14. By the action of said liquid or gas under pressure the mantle 5 is expanded, pushing forward the canvas material 2 and the india rubber material 3, so that said latter material will exactly fill up the mold 16, and take the position shown in Fig. 2, in which a space 18 is established between the mantles 4 and 5. The distance between the valves 10' and 12 may be adjusted in such a manner, that the valve 12 tightens against its seat 11 and cuts off the admission of gas or liquid under pressure when the india rubber material has filled up the mold.

The mantles 4 and 5 may also be formed of a flattened pipe 19', as shown in Fig. 5, the edges of which are fixed in the grooves 6 and 7 in the sides of the core or mandrel 1. The supply pipe 8 opens in the interior of said pipe 19', which on introducing gas or liquid under pressure to the same, is blown up, whereby the inner side of said pipe abuts against the surface of the core 1, whereas the outer side of the pipe pushes forward the canvas and the india rubber material, in the same manner as described with reference to Figs. 1 and 2.

For the purpose above mentioned only one single mantle may be used, in which case liquid or gas under pressure is introduced between said mantle and the surface of the core or mandrel 1, whereby the edges of said mantle are fixed on the core. The mantle may cover the whole core, if said core is divided in several parts, or it may cover a part of the core, in a similar manner as shown in Figs. 1 and 2, if the core is made in one single piece.

Fig. 3 shows a core 1, provided with one mantle 4, which covers the whole core. Said core is presumed to be divided in parts for facilitating the withdrawal of the same from the tire. The supply pipe 8 is tightly introduced through the mantle and may be provided, if desired, with a valve mechanism such as described above. For securing the edges of said mantle 4 and establishing a tight joint between them, they are bent at right angles, as shown at 19, 19, and said bent parts of the mantle are tightly clamped together by means of the rings 20, 20 and the screw bolts 21.

Fig. 4 shows a similar arrangement. The edges of the mantle 4 end near the inner part of the core 1, which is formed as a flange 22, and the rings 20 extend over the edges of the mantle, establishing a tight joint of said edges against the core, when pressed together by means of the bolts 21.

Having now particularly described my invention and set forth in what manner the same is to be performed, what I claim is:

1. A fluid-tight, hollow, stretchable, metallic mantle, and a core within said mantle.

2. A relatively thin-walled, fluid-tight, hollow lead tire-making mantle adapted to remain solid at vulcanizing temperatures and a core within said mantle.

3. In combination a fluid-tight, hollow, lead mantle and a core provided with an inlet for introducing an expanding fluid to said mantle.

4. In combination, an inner rigid metallic ring adapted to fit between the halves of a tire mold, an outer, annular, hollow, lead mantle thereon, and a core within said mantle.

5. In combination, a rigid metallic tongue-ring divided circumferentially into segments, an expansible, hollow, lead mantle seated thereon, and a core within said mantle.

6. In combination, an inner rigid metallic ring adapted to fit between the halves of a tire mold, an outer, annular, hollow, lead mantle thereon, provided with a fluid inlet-pipe extending through said ring, and a core.

7. In combination, a core having external molding surfaces, a flattened pipe of tensible material covering the molding surfaces of the core, means for affixing said pipe to the core and means for expanding the pipe.

8. In combination, a core having external molding surfaces, a double mantle of tensible material covering the molding surfaces of the core, means for affixing the mantle to the core, and means for introducing fluid under pressure to the interior of the mantle.

9. In combination, a core for making vulcanized articles, a mantle of tensible material covering certain surfaces of the core, means for expanding the mantle, and means for automatically checking the expansion when it has reached the desired degree.

10. In combination, a core for making vulcanized articles, a mantle of tensible material covering certain surfaces of the core, means for affixing the mantle to the core to render the interior of the same fluid-tight, means for introducing fluid under pressure to the interior of the said mantle, and means controlled by the expansion of the mantle for cutting off the fluid supply when the required degree of expansion has been reached.

11. In combination, a core for making vulcanized articles, a mantle of tensible material covering certain surfaces of the core, means for affixing the mantle to the core to render the interior of the same fluid-tight, an inlet for introducing fluid under pressure to the interior of the said mantle, a valve provided in the inlet and including a stationary member and a movable member associated therewith, the movable member being mounted to bear against the movable portion of the mantle, the valve being adapted normally to permit the entrance of fluid but to close the inlet when the movable member has reached a pre-determined position as influenced by expansion of the mantle, and means for causing the movable valve member to follow the movement of the mantle during expansion.

12. In combination, a core for making vulcanized articles, a mantle of tensible material covering certain surfaces of the core, means for affixing the mantle to the core to render the interior of the same fluid-tight, an inlet for introducing fluid under pressure to the interior of the said mantle, a valve provided in the inlet and including a stationary member and a movable member associated therewith, the movable member being mounted to bear against the movable portion of the mantle, the valve being adapted normally to permit entrance of fluid but to close the inlet when the movable member has reached a pre-determined position as influenced by expansion of the mantle, and means controlled by the current of fluid entering the mantle for causing the movable valve member to follow the movement of the latter during expansion.

13. In combination, a core for making vulcanized articles, a mantle of tensible material covering certain surfaces of the core, means for affixing the mantle to the core to render the interior of the same fluid-tight, an inlet for introducing fluid under pressure to the interior of the said mantle, a valve provided in the inlet and including a stationary member and a movable member associated therewith, the movable member being mounted to bear against the movable portion of the mantle, the valve being adapted normally to permit entrance of fluid but to close the inlet when the movable valve member has reached a pre-determined position as influenced by expansion of the mantle, means controlled by the current of fluid entering the mantle for causing the movable valve member to follow the movement of the latter during expansion, and yieldable means tending normally to restore the movable valve member to open position.

14. In combination, a core for making vulcanized articles, a mantle of tensible material covering certain surfaces of the core, means for fixing the mantle to the core to render the interior of the same fluid-tight, an inlet for introducing fluid under pressure to the interior of the said mantle, and a valve provided in the inlet and including a stationary member and a movable member associated therewith, the movable member being mounted to bear against the movable portion of the mantle, the valve being adapted normally to open the inlet for fluid but to close the inlet when the movable member has reached a pre-determined position as influenced by expansion of the mantle.

15. In apparatus of the class described, a hollow expansible mantle, means for admitting fluid under pressure to said mantle to expand same, and a valve for terminating the admission of the fluid, controllably responsive in its closing operation to the expanding movement of the mantle.

16. In apparatus of the class described, a hollow expansible mantle, a passage-way for admitting fluid under pressure to said mantle to expand same, and a valve movable in the direction of travel of the expanding fluid to closed position, controllably responsive to the expanding movement of the mantle.

17. In apparatus of the class described, a hollow expansible mantle, a passage-way for admitting fluid under pressure to said mantle to expand same, a valve movable in the direction of travel of the expanding fluid to closed position, controllably responsive to the expanding movement of the mantle, and a valve for closing the passage-way to maintain the fluid within the mantle when the fluid pressure is released.

In testimony whereof I have signed my name to this specification in the presence of two subscribing witnesses.

CARL GUSTAF ALFRED BÄCKDAHL.

Witnesses:
 ELM WAHMAN,
 SALLY FÄILE.